(12) United States Patent
Olijnyk et al.

(10) Patent No.: US 6,927,504 B2
(45) Date of Patent: Aug. 9, 2005

(54) VEHICLE MIRROR CONTROL CIRCUIT ARRANGEMENT

(75) Inventors: Mark Olijnyk, Hallett Cove South (AU); Alexander Gersch, Glenelg North (AU)

(73) Assignee: Schefenacker Vision Systems Australia Pty Ltd., Lonsdale (AU)

(*) Notice: Subject to any disclaimer, the term of this patent is extended or adjusted under 35 U.S.C. 154(b) by 334 days.

(21) Appl. No.: 10/088,935

(22) PCT Filed: Jul. 24, 2001

(86) PCT No.: PCT/AU01/00893

§ 371 (c)(1), (2), (4) Date: Jul. 15, 2002

(87) PCT Pub. No.: WO02/08018

PCT Pub. Date: Jan. 31, 2002

(65) Prior Publication Data

US 2003/0021048 A1 Jan. 30, 2003

(30) Foreign Application Priority Data

Jul. 24, 2000 (AU) .......................................... PQ 8945

(51) Int. Cl.⁷ ................................................. H02G 3/00
(52) U.S. Cl. ...................................................... 307/9.1
(58) Field of Search ............................. 307/9.1, 10.1; 701/49; 359/871–877

(56) References Cited

U.S. PATENT DOCUMENTS

| 4,871,953 A | 10/1989 | Anstee | 318/466 |
| 4,986,646 A | 1/1991 | Hamamoto et al. | 359/873 |
| 5,796,176 A | * 8/1998 | Kramer et al. | 307/10.1 |
| 5,949,592 A | 9/1999 | Brandin | 359/843 |

FOREIGN PATENT DOCUMENTS

| GB | 2076763 | 12/1981 |
| GB | 2102364 | 2/1983 |

* cited by examiner

*Primary Examiner*—Pia Tibbits
(74) *Attorney, Agent, or Firm*—Warn, Hoffmann, Miller & LaLone, P.C.

(57) ABSTRACT

A rear view mirror control circuit arrangement is disclosed for a vehicle. The vehicle may have at least two rear view mirror assemblies each having a housing and respective motors located external of the vehicle. The motors are adapted and mechanically coupled to mirror elements so as to control the position of the mirror elements with respect to the vehicle for the viewing convenience of the vehicle driver. The control circuit arrangement consists of a common electronic control circuit located internal of the vehicle for controlling each motor and predetermined other functions of the rear view mirror assembly. This has the advantage that only one common control circuit is used to control multiple mirrors that being located internal of the vehicle, protects it from extreme environmental and physical conditions. Furthermore, it is cheaper to design and supply as an OEM product to vehicle manufacturers.

18 Claims, 3 Drawing Sheets

VEHICLE MIRROR CONTROL CIRCUIT ARRANGEMENT

This invention relates to vehicle rear view mirrors and in particular to the electronic circuits used to control motorised versions of rear view mirrors.

BACKGROUND

Rear view mirrors both internal and external have developed over the years from being manually adjustable by the user from both inside and outside the vehicle, to being motorised and fully controllable (with multiple memorised and recoverable positions) from within the vehicle.

The typical arrangement of motors and control electronics, comprises motors located in the mirror housing usually behind the mirror glass with the associated electronic motor control circuit boards suitably small in size mounted adjacent thereto.

There has also been pressure on mirror designers to minimise the number of wires passing between both internal and external mirror assemblies and the internally located control switches and positioning levers. This constraint arises because the mirrors are an OEM product to the vehicle manufacturer and the less the manufacturer has to install and interface to the mirrors the better it is, as it lessens problems during design and manufacture.

However, the complexity of electronic circuits steadily increases as the number of functions associated with rear view mirrors increases, such as for example manually adjustable/rotatable lights, approach lights, retractability, memorised position setting and power folding. Therefore, since there are many rear view mirrors to control, the cost of providing these increasingly complicated circuits has also steadily increased. A mirror assembly that contains expensive electronics is clearly more costly to replace when damaged than if the mirror assembly did not contain those electronic control circuits. In a competitive market high prices for sophisticated products are not always readily acceptable and neither is it acceptable for replacement parts to be unnecessarily expensive. Locating expensive electronic in relatively safe environments will avoid costly replacement in the event the external mirror assembly is damaged.

It is an object of the invention to provide a more economical arrangement for the control of motorised and feature rich rear view mirrors, which is simpler and more robust in design and does not have the drawbacks of presently known systems.

BRIEF DESCRIPTION OF THE INVENTION

A rear view mirror control circuit arrangement for a vehicle having at least two rear view mirror assemblies each having a housing and respective motors located external of said vehicle, each of the motors adapted and mechanically coupled to respective mirror elements so as to control the position of a mirror element with respect to the vehicle, the control circuit arrangement consisting of a common electronic control circuit located internal of the vehicle for controlling each motor and predetermined other functions of the rear view mirror assembly.

Specific embodiments of the invention will now be described in some further detail with reference to and as illustrated in the accompanying figures. These embodiments are illustrative, and are not meant to be restrictive of the scope of the invention. Suggestions and descriptions of other embodiments may be included but they may not be illustrated in the accompanying figures, alternatively features of the invention may be shown in the figures but not described in the specification.

DETAILED DESCRIPTION OF EMBODIMENTS OF THE INVENTION

Figure 1:
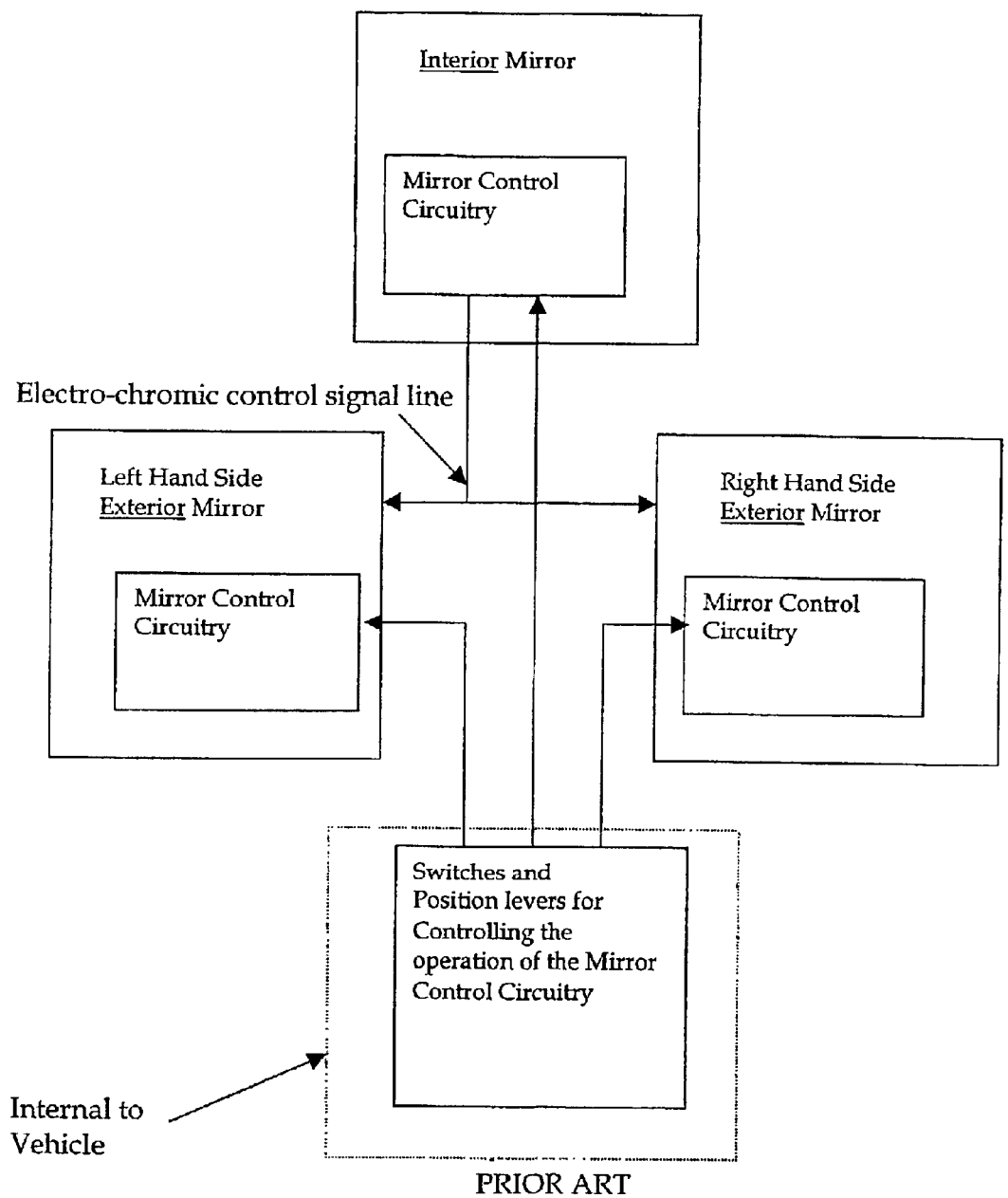
FIG. 1 depicts a block diagram of a prior art rear view mirror control circuit arrangement.

FIG. 1 depicts a block diagram of a prior art rear view mirror control circuit showing the positioning of mirror control circuitry in both the left and right side external mirror assemblies as well as an internal mirror assembly.

The circuitry is designed to fit into the confined spaces available in the mirror assembly and because the housing is exposed to the full extremes of environmental conditions in the case of external mirrors, additional expense is typically required to ensure reliable operation of the circuitry in conditions that include high humidity, extremes of temperatures and of course higher probabilities of accidental damage and high impacts.

The function of the circuitry is exactly the same on each side of the vehicle in respect of the external rear view mirrors and the circuits are therefore largely the same. Circuit boards for each side are possibly slightly different in shape, but preferably functionally identical so as to reduce the cost of manufacture.

The wiring loom between the two rear view mirrors (located external of the vehicle) and the switches and position levers (which are located internal of the vehicle), and the circuitry (located in each of the housings of the external rear view mirrors) will typically comprise at least one, wire for each switched function such as for example, an approach light, and a wire or wires providing signals representative of the x-y direction of movement required of the mirror glass and others. Two wires per switch are preferable since a single wire will rely on a sometimes unreliable current return path via the vehicle chassis.

The electromechanical arrangement which actuates the mirrors typically comprises two d.c. electric motors arranged so that the longitudinal axis of their drive shafts are at right angles to each other. The shafts are coupled to mechanical gearing (typically clutched) which actuates the mirror glass about one or another mutually orthogonal axis. The signals representative of the desired x-y direction of motion of the mirror glass are in this example, voltages of required polarity to drive the electric d.c. motor shafts in one or the reverse direction.

This motor actuation arrangement is used by way of example in the embodiments to be described.

However, accurate control of these motor drive voltages is required so that, for example, the voltages remain within safe working limits, the motors are not driven too far in one direction against the actuation mechanism or the motors are driven so that the mirror glass is moved to a predetermined position at a predetermined rate.

Typically, the left side or right side external rear view mirrors are controlled by the actuation of a two position switch arranged so that a movement of a particular switch to the right will with other control signals, activate the right hand side external rear view mirror and vice versa. The switch is typically located within easy arm's length of the driver of the vehicle.

A similar arrangement is available in some vehicles for controlling the interior rear view mirror. In some vehicles the head light detector is located in the internal rear view mirror and once an electro-chromic actuation signal is generated by the sensor, the internal rear view mirror electro-chromic function can be turned on, but only if there are appropriate signal wires to and from the sensor and control electronics, can the electro-chromic mirrors external of the vehicle be actuated.

Figure 2:
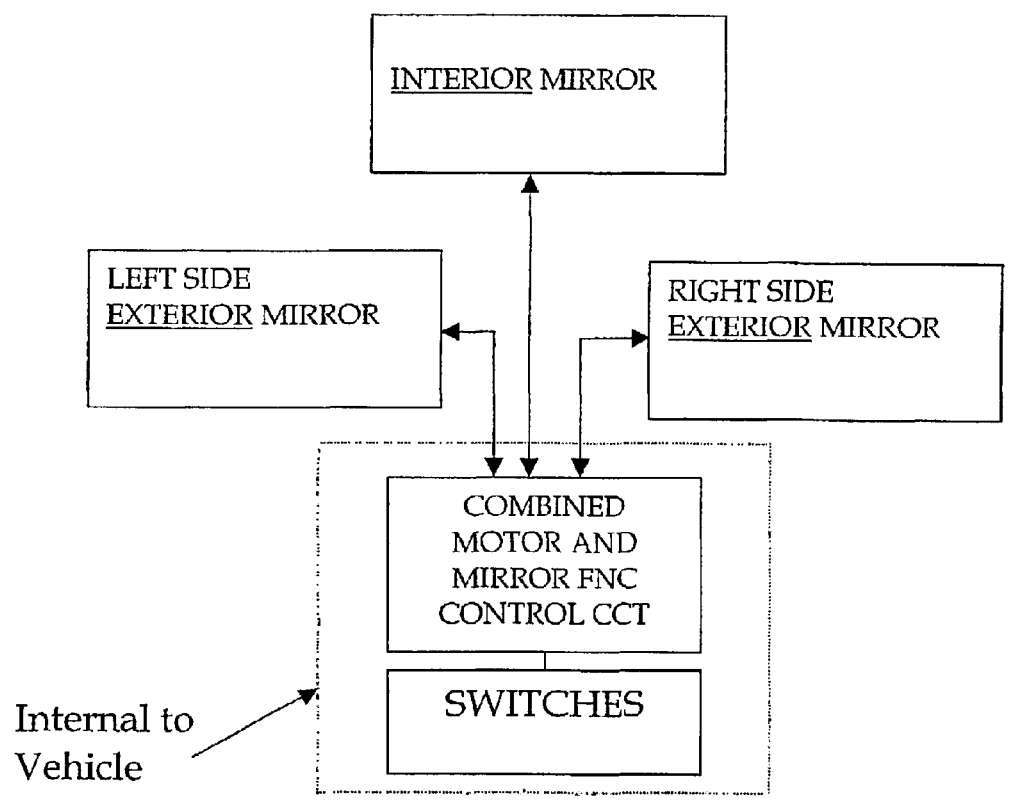
FIG. 2 depicts a block diagram of a rear view mirror control circuit arrangement according to the invention.

FIG. 2 depicts a block diagram of a preferred arrangement of a single rear view mirror assembly control circuit for multiple mirrors. The left and right side external rear view mirrors are provided voltages to actuate their relevant motors from a control circuit located internal of the vehicle. The internal rear view mirror is similarly provided wires which run from its housing to the internally located control circuit. Ideally, the control circuit is co-located with all the necessary buttons and actuators. Some of which are multi-use.

Figure 3:
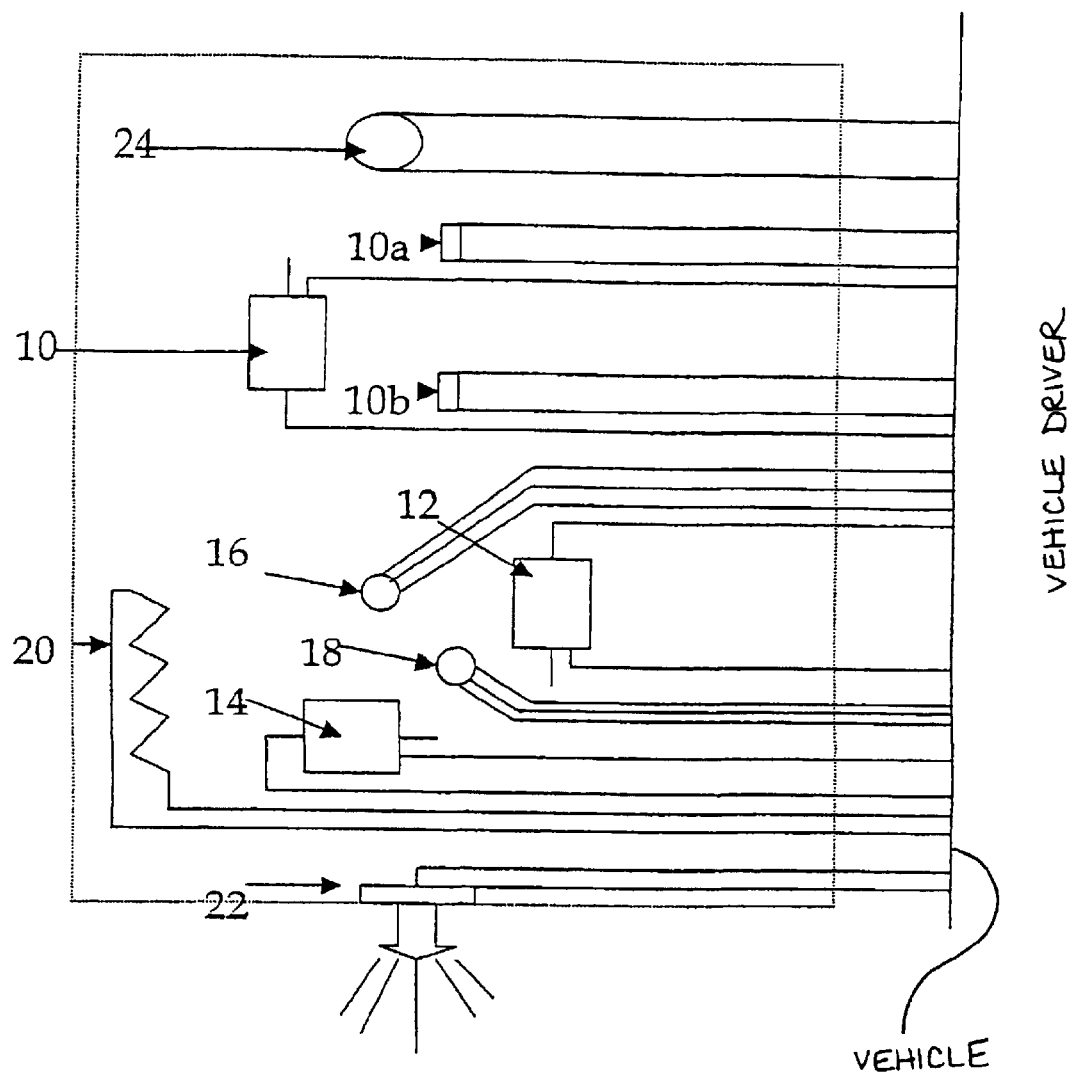
FIG. 3 depicts a possible configuration of an external rear view mirror and the wiring required to join it to the centralised mirror control location.

In this embodiment, the left and right hand exterior mirror housings enclose the requisite motors (sometimes just a single motor can be arranged to actuate the mirror glass into a required orientation) and other electrical circuits that provide features such as a demisting heater, approach light, sensor(s) to detect the mirror glass position, electro-chromic glass, power folding and telescoping mirror positioning elements are also contained therein, as is pictorially represented in FIG. 3.

Not all the above mentioned functions are necessarily used on both sides of the vehicle or in every vehicle.

However, the motor control circuit (now located internal of the vehicle) that drives the mirror glass to a desired or predetermined desired position, can be used in turn by driving one then the other mirror into position. A sensor signal interpretation circuit (not shown) can also be used in turn to analyse signals from respective mirror housings so as to determine the relative positions of the mirror glass. A single, suitably rated circuit can also power the demisting heaters in each mirror housing (if fitted) and likewise similarly the approach lights of each mirror housing can be controlled by a single circuit. Thus it will be apparent that a great saving in circuit design and components can be achieved by using the same circuit for both mirrors.

There is also space saving, in that the circuit board upon which this circuit is provided can be integrated into the switch and/or switch housing internal of the vehicle which can also be arranged to control like functions of internally located rear view mirrors. This has a benefit in that the wiring required to be provided by the vehicle manufacturer in each vehicle comprises a single high power cable to the switch housing while all other wiring is preferably provided in the form of low power wiring looms, connected between control circuit and each of the side exterior mirrors and others as required for other rear view mirrors which are located internally or externally of the vehicle.

The external appearance of the driver accessible mirror control switches can be specified by the vehicle manufacturer but the control circuit is hidden from view and can be sized and shaped so as to fit either adjacent to or integrate with the switches or switch housing according to the available space specified by the vehicle manufacturer.

If there is a need to control the operation of the approach lights in either or both the external rear view mirrors when the vehicle is remotely unlocked (typically as the driver approaches the vehicle), additional input wires for provision of this signal to the control circuit can be specified by the motor vehicle manufacturer and a suitable connector provided by the control circuit designer.

In some vehicles an in-vehicle signal bus is used to communicate control and status between various elements on the vehicle. The circuit arrangement described above can be organised to utilise such a bus system by incorporating the required hardware and software interface to the common rear view mirror control circuit typically located adjacent the control switches as well as the provision of associated hardware and software interfaces in each of the rear view mirror housings.

It is also advantageous that since the common rear view mirror control circuit is located internal of the vehicle it does not need to be as rugged as would be required if it were mounted internal of the external mirror housing where it is liable to experience high impact forces that stress the circuit board and all the soldered connections.

FIG. 3 depicts some of the elements that may be incorporated into an external rear view mirror housing. Some of the elements may also be incorporated in an internal rear view mirror and some elements in the internal mirror may be unique to that housing.

For truck mounted external rear view mirrors, it is advantageous to have a telescoping function for which motor 10 is the actuator of the movement of the mirror housing inwards and outwards with respect to the truck body. In one embodiment, sensors 10a and 10b are used to detect the limits of motion of the mirror, therefore ensuring the appropriate control of the telescoping movement of the mirror housing. At least six wires are used for this particular function. However, the need for sensors and the additional wires can be eliminated by using other position sensing techniques, such as for example, motor current sensing which cuts off motive power once the current being drawn by the motor rises above a predetermined level for a predetermined time. Thus the need for specific sensor wires may be eliminated because the increased complexity of the circuit alternatives can be economically shared in a common rear view mirror control circuit.

Motors 12 and 14 are operated to activate via appropriate mechanical linkages, and the orientation of the mirror glass with respect to the mirror housing can be set.

Sensors 16 and 18 are used to determine the relative position of the mirror glass by detecting movement along two orthogonal axes. The sensors are fixed at one point to the mirror housings and at another point to the mirror glass so that a relative position can be determined. The sensors may be of the potentiometer type and thus will require three wires, (as shown), to provide a signal representative of the relative mirror position along a respective axis. Advances in motor manufacture and design may allow in the future accurate mirror positioning without feedback sensors. Therefore, motor control intelligence can be designed into the common rear view mirror control circuit and the number of wires in the loom can be further reduced.

A heater 20 is shown as having two wires but may only need one wire if a common earth is provided amongst other elements in the mirror housing.

An approach light 22 can be similarly wired to that of the heater 20 and of course adequate current carrying capacity is required at the input and output of the respective elements.

Some approach lights can be adjustable (eg rotatable) to provide illumination in a variety of directions. This increased functionality thus requires additional control circuitry A further element 24 could represent the operation of electro-chromic glass which can be remotely operated as conditions require. Sensors (not shown) could also be located as required in the mirror housing and used to signal to the control circuit the various parameter required to determine the need to operate the chromic glass. Those sensors may be located in an internal rear view mirror and wiring from the internal mirror to the central control circuit can be used to trigger this function in other external rear view mirrors.

In the embodiment shown, some 23 wires are required to be routed to the control circuit from the external mirror housing. This can be most conveniently done by using a wiring loom, and it is typical to use flat multi-stranded cable and suitable connectors chosen for ease of fitting and removal for testing.

Two such wiring looms are required in the external rear view mirror arrangement, one from the left and one from the right side external rear view mirror housings to the control circuit located within the vehicle.

Voltage drops are minimised by using appropriately gauged wire and extra wires are readily provided in the loom to support future connection between sensors and actuators in the mirror housing and the common control circuit. Spare wires can also be used for loop back testing and voltage and current signalling for maintenance and control purposes.

It will be appreciated by those skilled in the art, that the invention is not restricted in its use to the particular application described and neither is the present invention restricted in its preferred embodiment with regard to the particular elements and/or features described or depicted herein. It will be appreciated that various modifications can be made without departing from the principles of the invention, therefore, the invention should be understood to include all such modifications within its scope.

What is claimed is:

1. A rear view mirror control circuit arrangement for a vehicle having at least two rear view mirror assemblies each having a housing and respective motors located external of said vehicle, said motors adapted and mechanically coupled to mirror elements so as to control the position of said mirror element with respect to said vehicle, said control circuit arrangement comprising:

a common electronic motor control circuit located internal of said vehicle for providing substantially all necessary circuitry for supplying a voltage to and controlling each said motor and predetermined other functions of said rear view mirror assembly.

2. A rear view mirror control circuit according to claim 1 wherein said common electronic control circuit controls a motor located in said rear view mirror assembly, said common electronic control circuit being located internal of said vehicle.

3. A rear view mirror control circuit according to claim 1 wherein said common electronic control circuit is co-located with control elements for use by a driver of said vehicle.

4. A rear view mirror control circuit according to claim 1 further comprising at least one sensor in said rear view mirror assembly, said rear view mirror control circuit responding to a signal from said at least one sensor to control one or more of said predetermined other functions of said rear view mirror assembly.

5. A rear view mirror control circuit according to claim 1 further comprising a heat generating member located within at least one of said at least two rear view mirror assemblies.

6. A rear view mirror control circuit according to claim 1 further comprising a light emitting member located within at least one of said at least two rear view mirror assemblies.

7. A rear view mirror control circuit according to claim 1 further comprising an electrochromic glass member located within at least one of said at least two rear view mirror assemblies.

8. A rear view mirror control circuit arrangement for a vehicle having at least two rear view mirror assemblies each having a housing and respective motors located external of said vehicle, said motors adapted and mechanically coupled to mirror elements so as to control the position of said mirror element with respect to said vehicle, said control circuit arrangement comprising:

a common electronic motor control circuit located internal of said vehicle for providing substantially all necessary circuitry for supplying a voltage to and controlling each said motor and predetermined other functions of said rear view mirror assembly; and at least one sensor in said rear view mirror assembly, said rear view mirror control circuit responding to said signals to control one or more of said predetermined other functions of said rear view mirror assembly.

9. A rear view mirror control circuit according to claim 8 wherein said common electronic control circuit controls a motor located in said rear view mirror assembly, said common electronic control circuit being located internal of said vehicle.

10. A rear view mirror control circuit according to claim 8 wherein said common electronic control circuit is co-located with control elements for use by a driver of said vehicle.

11. A rear view mirror control circuit according to claim 8 further comprising a heat generating member located within at least one of said at least two rear view mirror assemblies.

12. A rear view mirror control circuit according to claim 8 further comprising a light emitting member located within at least one of said at least two rear view mirror assemblies.

13. A rear view mirror control circuit according to claim 8 further comprising an electrochromic glass member located within at least one of said at least two rear view mirror assemblies.

14. A rear view mirror control circuit arrangement for a vehicle having at least two rear view mirror assemblies each having a housing and respective motors located external of said vehicle, said motors adapted and mechanically coupled to mirror elements so as to control the position of said mirror element with respect to said vehicle, said control circuit arrangement comprising:

a common electronic motor control circuit located internal of said vehicle for providing substantially all necessary circuitry for supplying a voltage to and controlling each said motor and predetermined other functions of said rear view mirror assembly; and at least one sensor in said rear view mirror assembly, said rear view mirror control circuit responding to said signals to control one or more of said predetermined other functions of said rear view mirror assembly;

wherein said common electronic control circuit controls a motor located in a said rear view mirror assembly, said common electronic control circuit being located internal of said vehicle.

15. A rear view mirror control circuit according to claim 14 wherein said common electronic control circuit is co-located with control elements for use by a driver of said vehicle.

16. A rear view mirror control circuit according to claim 14 further comprising a heat generating member located within at least one of said at least two rear view mirror assemblies.

17. A rear view mirror control circuit according to claim 14 further comprising a light emitting member located within at least one of said at least two rear view mirror assemblies.

18. A rear view mirror control circuit according to claim 14 further comprising an electrochromic glass member located within at least one of said at least two rear view mirror assemblies.

* * * * *